US007778490B2

(12) United States Patent
Quist

(10) Patent No.: US 7,778,490 B2
(45) Date of Patent: Aug. 17, 2010

(54) METHOD OF IMAGE REGISTRATION AND MEDICAL IMAGE DATA PROCESSING APPARATUS

(75) Inventor: Marcel Johannes Quist, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 1434 days.

(21) Appl. No.: 10/541,406

(22) PCT Filed: Dec. 4, 2003

(86) PCT No.: PCT/IB03/05898

§ 371 (c)(1),
(2), (4) Date: Jul. 1, 2005

(87) PCT Pub. No.: WO2004/063990

PCT Pub. Date: Jul. 29, 2004

(65) Prior Publication Data

US 2006/0188134 A1    Aug. 24, 2006

(30) Foreign Application Priority Data

Jan. 13, 2003    (EP)    ................... 03075076

(51) Int. Cl.
*G06K 9/32* (2006.01)
*G06K 9/00* (2006.01)
(52) U.S. Cl. ...................................... 382/294; 382/128
(58) Field of Classification Search ................. 382/128, 382/131, 276, 294, 293, 302; 128/898
See application file for complete search history.

(56) References Cited

U.S. PATENT DOCUMENTS

| 4,644,582 | A | | 2/1987 | Morishita et al. |
| 5,575,286 | A | | 11/1996 | Weng et al. |
| 5,876,342 | A | * | 3/1999 | Chen et al. ................. 600/443 |
| 6,078,701 | A | | 6/2000 | Hsu et al. |
| 6,266,453 | B1 | | 7/2001 | Hibbard et al. |
| 6,360,027 | B1 | * | 3/2002 | Hossack et al. ............. 382/294 |
| 2002/0141626 | A1 | | 10/2002 | Caspi |

FOREIGN PATENT DOCUMENTS

| EP | 1184802 A2 | 3/2002 |
| WO | 0101346 A1 | 1/2001 |
| WO | 0145046 A1 | 6/2001 |

OTHER PUBLICATIONS

S. Meshould et al; "A Fully Automatic Method for Feature-Based Image Registration", Computer Vision Group, Lire Lab, Algeria, vol. 7, Oct. 6, 2002, pp. 695-699, XP010623559.

(Continued)

*Primary Examiner*—Yon Couso

(57) ABSTRACT

The present invention relates to a method of image registration comprising the steps of, a) providing at least first image data and second image data, b) selecting of sub-volumes of the first and the second image data, c) performing a registration for each one of the sub-volumes, each registration providing a transformation parameter set, d) performing a global registration for the first and second image data, the global registration providing a global transformation parameter set, e) comparing one of the transformation parameter sets to other transformation parameter sets and/or to the global transformation parameter set for identification of an outlier transformation parameter set of the transformation parameter sets, f) outputting of a signal being indicative of the sub-volume of the outlier transformation parameter set.

20 Claims, 3 Drawing Sheets

OTHER PUBLICATIONS

Figure 1:
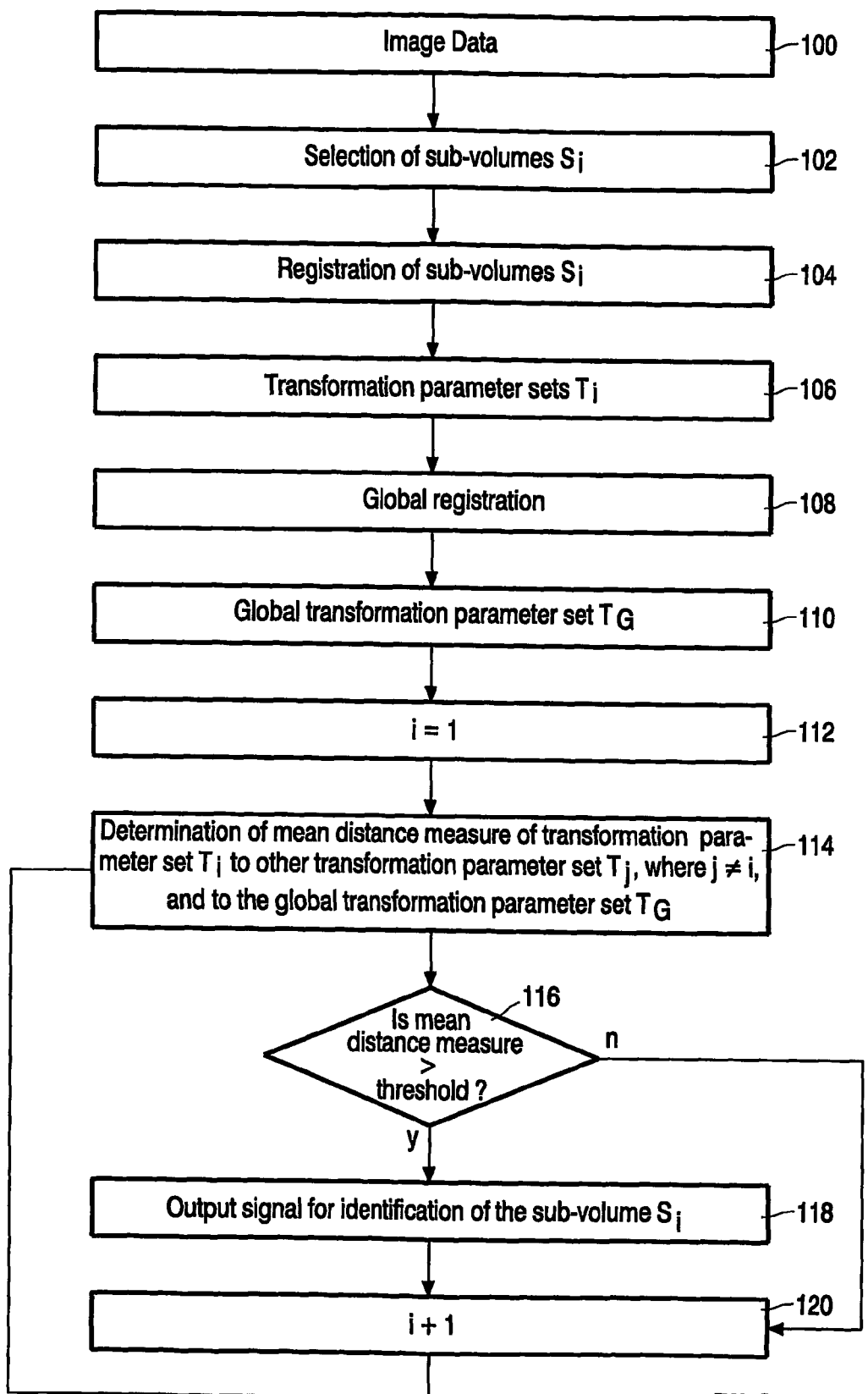

Lei Bao et al; "Registration in Digital Subtraction Angiography Using Multiple Roi's", Eng. in Medicine and Bio. 11, Mar. 1994, NY, pp. 502-503, XP010145303.

Paul Thompson; "Elastic Image Registration and Pathology Detection", Lab of Neuro Imaging, Los Angeles, CA, USA.
ISR: PCT/IB03/005898.

* cited by examiner

METHOD OF IMAGE REGISTRATION AND MEDICAL IMAGE DATA PROCESSING APPARATUS

The present invention relates to image registration, and more particularly without limitation, to image registration in medical diagnostic systems.

In current clinical practice, it is not uncommon that several medical images are to be compared or combined. For example, this occurs when images of a single individual are acquired by different techniques, each producing different information about the individual. One technique may depict brain function very well and another a brain tumour.

The combination of the two is crucial in determining whether the tumour can be resected without damaging vital brain areas. A second example is that of images of an individual taken over a period of time. This can be used, among other things, to study the development of anatomical structures. Besides the comparison of images of a single individual, comparisons of images of different individuals is also performed, e.g. to study the differences and similarities between groups.

To be able to compare images, the contents of the images must be in alignment. This is often not the case for numerous reasons, such as movement of the individual or differences in the field of view (the part of the anatomy that is captured in the images). The process of finding the correspondence between the contents of images is called image registration. This is achieved by optimizing a measure of similarity between images, such as the position of corresponding landmarks or the similarity in intensity of corresponding anatomical structures.

In most cases, global translations and rotations suffice to align images. When one image has to be deformed, however, to fit the contents of the other this is referred to as non-rigid or elastic registration. This is necessary for registration of images of different individuals (who have different anatomies) or images of a single individual when an anatomical change has taken place.

Various image registration techniques are known from the prior art, such as from WO 01/01346 A1, EP 1 184 802 A2, US 2002/0 141 626 A1, U.S. Pat. No. 6,266,453 B1.

The book "Medical Image Registration" by Josef Hajnal provides an overview of the various prior art image registration techniques. As far as elastic image registration is concerned the article "Elastic Image Registration and Pathology Detection" by Paul Thompson and Arthur W. Toga (http://www.loni.ucla.edu/~thompson/PDF/no_pics_ElasChpt.pdf) provides an overview of the known approaches for elastic image registration. This article is also published as a book chapter in "Handbook of Medical Image Processing", Academic Press, 2000.

A common disadvantage of prior art image registration methods is the lack of an objective quality criterion. So far, the only reliable way to check the results of the image registration is visual assessment by a human observer. This is a practical problem that substantially limits the application of registration methods. For example, in case of time series where many sequential images have to be registered it is impractical to interrupt an otherwise automatic pre-processing method. This is also true if registration is part of a pre-processing chain.

It is therefore an object of the present invention to provide for an improved method of image registration which addresses the problems of the prior art. It is a further object of the present invention to provide for an improved computer program product and improved medical image data processing apparatus for image registration.

The present invention provides for an improved method of image registration where registrations are performed for a number of sub-volumes of the image to be registered in addition to a global registration. For example, a number of sub-volumes contained in the image data is selected manually by an operator by marking the sub-volumes of interest.

For this purpose a graphical user interface (GUI) can be utilized. Alternatively or in addition an automatic image segmentation can be performed for identification of such sub-volumes. For example, each of the sub-volumes contains a certain medical region of interest, such as an organ or a tumour.

In accordance with the present invention a registration is performed for each one of the sub-volumes in addition to a global registration of the image data. This enables to identify an outlier sub-volume which substantially deviates from the transformation of the other sub-volumes and the global registration. Such an outlier sub-volume can be cut off in order to improve the overall registration result or it can trigger a subsequent elastic registration for improved registration. The transformation parameter set obtained in the first registration step can be used as an input parameter set for the subsequent elastic registration.

The present invention is particularly advantageous as it registers sub-volumes of the images and translates the registration results to global transformations. In particular this enables a comparison of the resulting transformations which indicates:

the accuracy of the global transformation, e.g. by measuring variations,
the reason for the inaccuracy, e.g. too much constraint transformation,
the location of the problem in the images, e.g. local image artefacts.

In some applications outliers in the registration of the sub-volumes are likely to originate from image artefacts or unequal anatomies in the images such as pathology, especially if the structures can be assumed as rigid, such as the scull. An example is neural-MR where a sub-volume is selected on a tumour that does not exist on the other image. Another example is neural-CT where a sub-volume is selected on image artefacts caused by metal fillings. A possible reaction to this detected origin of inaccuracy can be to signal for user-interaction or to cut-off this section for a more accurate global registration.

If the image is to be registered e.g. in the abdomen with the deforming organs such as the liver an additional processing step is performed for improved registration rather than cutting-off the corresponding sub-volume. An inaccurately registered sub-volume can be caused by deformation of the organ, e.g. due to breathing motion, which cannot be appropriately dealt with by a rigid, global transformation. In this case a refinement and/or localization of the transformation is performed in order to improve the registration of this sub-volume. For this improved registration the transformation can be locally extended with more degrees of freedom; in particular non-rigid or elastic image registration can be used for this purpose.

Another advantageous application of the present invention is the detection of artefacts in MR inter-leaved scans, i.e. the even and odd slices being not aligned. Image interpolation between the slices results in double edges and other artefacts which make registration inaccurate and can result in a low quality after the reformatting which is subsequent to the registration. The present invention enables to detect such artefacts in order to warn a user that artefacts are present in the MR inter-leaved scans.

In essence, the invention provides for a sub-regional registration to be performed alongside the global registration of the full images. Sub-regions or sub-volumes, of the images to be registered are selected and are registered throughout the sequence of images. In accordance with a preferred embodiment a table of registration information is compiled for all sub-regions and the global registration containing translation and rotation information. Quantification of the registration process is therefore possible over sub-regions and allows identification of inaccuracies within the overall registration process.

In particular, this enables to draw the users attention to the sub-volume or sub-volumes of the global image where the registration process has failed and manual orientation is required. Alternatively the result of the registration method of the invention can be incorporated into a fully automated image handling sequence which enables spurious sections of the sequence of images to be removed.

Figure 2:
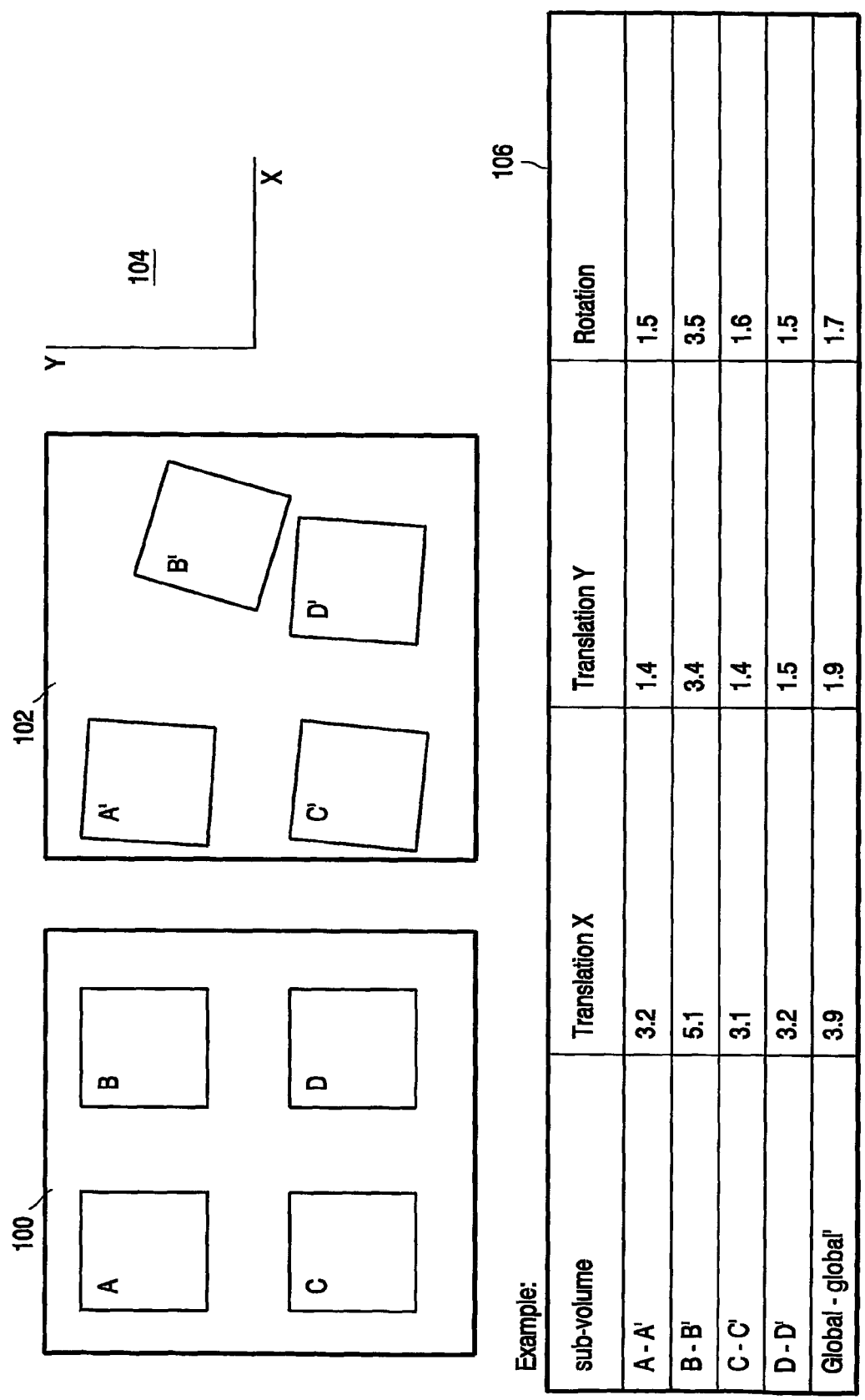
Figure 3:
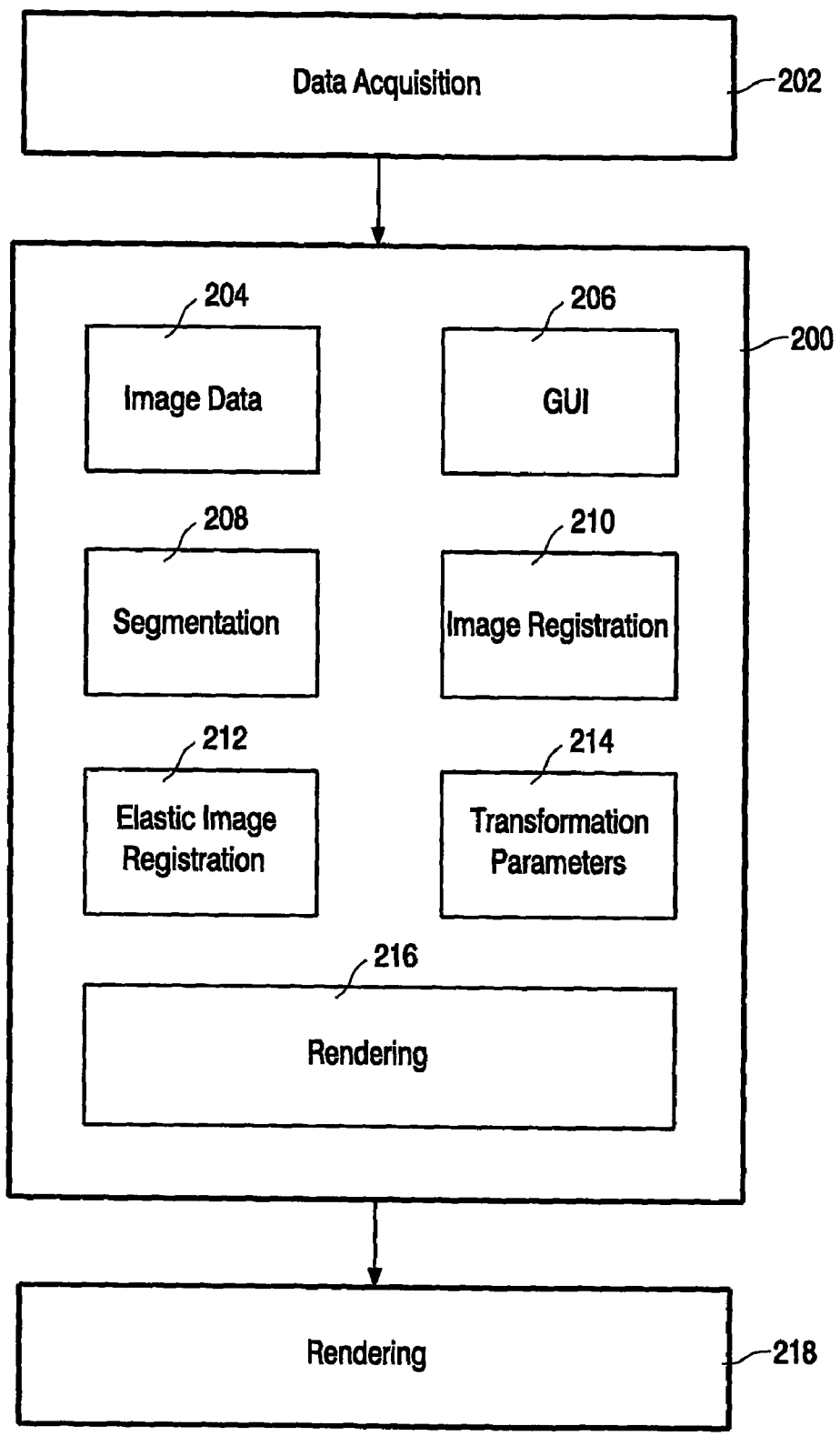

In the following preferred embodiments of the invention are explained in greater detail by making reference to the drawings in which:

FIG. 1 is illustrative of a flow diagram of an embodiment of a method of the invention, FIG. 2 is a schematic example for the registration of sub-volumes, FIG. 3 is a block diagram of a medical image data acquisition and processing system.

FIG. 1 shows a flow diagram of an embodiment of the registration method of the invention. In step 100 image data is provided by an imaging modality. Depending on the application all of the image data are provided by the same image modality. Alternatively the image data of different image modalities are to be combined. For example, X-ray imaging, magnetic resonance imaging (HI), computer tomography (CT) imaging, functional MRI (fMRI), single photon emission computer tomography (SPECT) or positron emission tomography (PET) are used as image modalities.

In step 102 a selection of sub-volumes $S_i$ in the image data is performed. This can be done manually by marking the sub-volumes $S_i$ on a display or by performing an image segmentation step or another suitable image processing step for identification of sub-regions or sub-volumes in the image data.

In step 104 image registrations are performed locally for the selected sub-volumes $S_i$. For example, these registrations are performed by means of a rigid image registration method. In step 106 a parameter set $T_i$ is outputted for each one of the sub-volumes $S_i$ for which a registration has been performed. Each one of the transformation parameter sets $T_i$ is descriptive of the displacement of the corresponding sub-volume $S_i$ in the two images to be registered.

In step 108 a global registration is performed for the images to be registered. Again a rigid image registration method can be employed for this purpose. In step 110 a global transformation parameter set $T_G$ is outputted. The global transformation parameter set $T_G$ is descriptive of the displacement of the images to be registered with respect to each other.

In step 112 the index i is initialized to be equal to one.

In step 114 a mean distance measure is calculated for the transformation parameter set $T_i$. This can be done by calculating a distance measure between the transformation parameter set $T_i$ and each one of the other transformation parameter sets $T_j$ and to the global transformation parameter set $T_G$ and calculating a mean value on the basis of these individual distance measures. For this purpose any distance measure for the determination of the distance between two parameter sets or vectors can be used, such as Euclid's distance. For example Euclid's distance is calculated for all pairs of parameter sets $T_i$, $T_j$, where i≠j. and the resulting Euclid's distances are added. This provides the mean distance measure.

In step 116 it is determined whether the mean distance measure of step 114 is above a threshold level. If this is not the case the registration of the corresponding sub-volume $S_i$ is deemed to be sufficiently accurate and the control goes to step 120 to increment the index i.

If the mean distance measure is above the threshold the control goes from step 116 to step 118. In step 118 an output signal is generated for identification of the sub-volume $S_i$. This output signal can be outputted as a warning signal by means of a graphical user interface in order to warn an operator that the registration of the sub-volume $S_i$ is inaccurate. Alternatively or in addition the output signal generated in step 118 triggers the execution of an additional non-rigid, elastic image registration procedure for improved registration of the sub-volume $S_i$ and/or for improved global registration.

As an alternative to steps 114 and 116 another statistical method can be used to identify an outlier parameter set and corresponding sub-volume.

FIG. 2 shows a schematic example. The example is illustrative of an application in two dimensions for convenience of explanation. It is to be noted that the example can be extended to more dimensions.

Image 100 is a slice or "slab" of image data which has been acquired by medical image data acquisition. Image 100 is located in the XY-plane 104. Image 102 is also within plane 104 and needs to be registered with image 100.

Image 100 contains the sub-volumes A, B, C and D. These sub-volumes are selected by marking the corresponding regions in image 100 by means of a graphical user interface by an operator and/or by a segmentation step or another suitable data processing step for identification of such regions of interest. Image 102 has corresponding sub-volumes A', B', C' and D'.

An image registration is performed both globally for images 100 and 102 and for the individual sub-volumes. This means that the sub-volumes A and A' are registered as well as the sub-volumes B-B', C-C' and D-D'.

Table 106 of FIG. 2 shows the resulting transformation parameter sets. In the example considered here the transformation parameter set for each individual image registration contains the amount of displacement in the X and Y directions within plane 104 as well as the amount of angular transformation in degrees of rotation.

From table 106 it is apparent that the transformation parameter set for the registration of the sub-volume B-B' substantially deviates from the other transformation parameter sets. The sub-volume B-B' is therefore identified as an outlier. In response a corresponding warning signal is outputted and/or an elastic registration procedure is triggered for improved registration of the sub-volume B-B'. The fact that the transformation parameter set of the sub-volume B-B' is an outlier can be determined by processing table 106 by means of suitable statistical methods and/or by calculating of distance measures.

FIG. 3 shows a block diagram of a computer 200 which is coupled to a medical image data acquisition apparatus 202. Computer 200 has memory 204 for the storage of image data and has a graphical user interface 206. Further computer 200 has segmentation program module 208, image registration program module 210, elastic image registration program module 212 and memory 214 for the storage of transformation parameters (cf. table 106 of FIG. 2). In addition computer 200 has program 216 for controlling the operation of these various components. Computer 200 is coupled to display 218 for rendering of image data. Alternatively or in addition computer 200 is connected to a printer.

In operation the image data is loaded into memory 204 from image data acquisition apparatus 202. The image data is rendered on display 218. By means of graphical user interface 206 an operator can select a number of sub-volumes in the image data. Alternatively or in addition sub-volumes are selected automatically by means of segmentation program module 208.

Image registrations are performed by means of program module 210 for registering of the sub-volumes and for performing a global image registration. The corresponding transformation parameters are stored in memory 214 for analysis by program 216. When program 216 identifies an outlier sub-volume a warning message is generated and outputted on display 218. Alternatively or in addition program 216 triggers program module 212 for performing an elastic image registration for the outlier sub-volume.

LIST OF REFERENCE NUMBERS

100 image
102 image
104 plane
106 table
200 computer
202 image data acquisition apparatus
204 memory
206 GUI
208 segmentation program module
210 program module
212 program module
214 memory
216 program
218 display

The invention claimed is:

1. A method of image registration comprising the steps of:
providing at least first image data and second image data;
selecting of sub-volumes of the first and the second image data;
performing with a processor a registration for each one of the sub-volumes, each registration providing a transformation parameter set;
performing with the processor a global registration for the first and second image data, the global registration providing a global transformation parameter set;
comparing with the processor one of the transformation parameter sets to other transformation parameter sets and/or to the global transformation parameter set for identification of an outlier transformation parameter set of the transformation parameter sets;
performing a registration of the outlier transformation parameter set; and
outputting of a signal being indicative of the sub-volume of the outlier transformation parameter set.

2. The method of claim 1, whereby the first image data and/or the second image data is provided by X-ray imaging, magnetic resonance imaging, computer tomography imaging, functional MRI, single photon emission computer tomography or positron emission tomography.

3. The method of claim 1, whereby the selection of the sub-volumes is performed manually by means of a graphical user interface.

4. The method of claim 1, whereby the selection of the sub-volumes is performed by means of an image segmentation step.

5. The method of claim 1, further comprising calculating a mean distance measure of the one of the transformation parameter sets to the other transformation parameter sets and to the global transformation parameter set, whereby the comparison of the one of the transformation parameter sets with the other transformation parameter sets and the global transformation parameter set is performed on the basis of the mean distance measure for determining whether the one of the transformation parameter sets is an outlier transformation parameter set.

6. The method of claim 5, whereby the one of the transformation parameter sets is identified as an outlier transformation parameter set, if the mean distance measure of the one of the transformation parameter sets is greater than a threshold distance value.

7. The method of claim 1, further comprising cutting off of the sub-volume of the outlier transformation parameter set.

8. The method of claim 1, further comprising performing an elastic image registration in response to the signal.

9. A computer program product, in particular digital storage medium, comprising program means for registration of at least first image data and second data, the program means being adapted to perform the steps of:
storing of a selection of sub-volumes of the first and second image data;
performing a registration for each one of the sub-volumes, each registration providing a transformation parameter set;
performing a global registration for the first and second image data, the global registration providing a global transformation parameter set;
comparing one of the transformation parameter sets to other transformation parameter sets and/or to the global transformation parameter set for identification of an outlier transformation parameter set of the transformation parameter sets;
performing a registration of the outlier transformation parameter set; and
outputting of a signal being indicative of the sub-volume of the outlier transformation parameter set.

10. A medical image data processing apparatus comprising:
a memory for a storage of at least first and second image data;
means for selecting of sub-volumes of the first and second image data;
means for performing a registration for each one of the sub-volumes and for a global registration of the first and second image data, each registration providing a transformation parameter set;
means for identification of an outlier transformation parameter set of the transformation parameter sets on the basis of the transformation parameter sets;
means for performing an image registration when the outlier transformation parameter set has been identified; and
means for outputting of a signal being indicative of the sub-volume of an identified outlier transformation parameter set.

11. The medical image data processing apparatus of claim 10, further comprising a graphical user interface for selection of the sub-volumes.

12. The medical image data processing apparatus of claim 10, further comprising means for image segmentation for the selection of the sub-volumes.

13. The medical image data processing apparatus of claim 10, wherein the image registration is an elastic image registration.

14. The medical image data processing apparatus of claim 10, wherein the first image data and/or the second image data is provided by X-ray imaging, magnetic resonance imaging, computer tomography imaging, functional MRI, single photon emission computer tomography or positron emission tomography.

15. The medical image data processing apparatus of claim 10, further comprising means for calculating a mean distance measure of the one of the transformation parameter sets to the other transformation parameter sets and to the global transformation parameter set, wherein the comparison of the one of the transformation parameter sets with the other transformation parameter sets and the global transformation parameter set is performed on the basis of the mean distance measure for determining whether the one of the transformation parameter sets is an outlier transformation parameter set.

16. The medical image data processing apparatus of claim 15, wherein one of the transformation parameter sets is identified as an outlier transformation parameter set if the mean distance measure of the one of the transformation parameter sets is greater than a threshold distance value.

17. The medical image data processing apparatus of claim 10, means for cutting off of the sub-volume of the outlier transformation parameter set.

18. The medical image data processing apparatus of claim 10, further comprising means for performing an elastic image registration in response to the signal.

19. The method of claim 1, wherein the registration of the outlier transformation parameter set is an elastic registration.

20. The computer program product of claim 9, wherein the registration of the outlier transformation parameter set is an elastic registration.

* * * * *